United States Patent
Sozzi

[11] 4,026,184
[45] May 31, 1977

[54] BALL ANCHOR DOWEL

[75] Inventor: Dante Sozzi, Vaduz, Switzerland

[73] Assignee: Hilti Aktiengesellschaft, Schaan, Liechtenstein

[22] Filed: May 1, 1975

[21] Appl. No.: 573,422

[30] Foreign Application Priority Data

May 2, 1974 Germany .................... 2421258

[52] U.S. Cl. .................... 85/63; 85/74; 85/77
[51] Int. Cl.² .................... F16B 13/04
[58] Field of Search .......... 85/63, 64, 65, 77, 78, 85/73, 74, 75; 61/45 B

[56] References Cited

UNITED STATES PATENTS

| 631,765 | 8/1899 | Burk | 85/69 X |
|---|---|---|---|
| 677,373 | 7/1901 | Rauhoff | 85/79 X |
| 1,307,418 | 6/1919 | Raeger | 85/63 |
| 2,314,445 | 3/1943 | Du Vall | 85/63 |
| 2,319,376 | 5/1943 | Wallace | 85/75 |
| 2,872,838 | 2/1959 | Vogel | 85/85 |
| 2,950,602 | 8/1960 | Lang | 85/63 |

FOREIGN PATENTS OR APPLICATIONS

| 81,638 | 12/1956 | Denmark | 85/73 |
|---|---|---|---|
| 75,641 | 3/1953 | Denmark | 85/83 |
| 510,113 | 8/1920 | France | 85/77 |
| 928,122 | 5/1947 | France | 85/77 |
| 46-21128 | 6/1971 | Japan | 85/77 |
| 115,187 | 10/1945 | Sweden | 85/78 |
| 195,369 | 7/1923 | United Kingdom | 85/73 |

Primary Examiner—Roy D. Frazier
Assistant Examiner—Thomas J. Holko
Attorney, Agent, or Firm—Toren, McGeady and Stanger

[57] ABSTRACT

A ball anchor dowel, arranged to be inserted into and expanded into anchoring contact with a bore hole, is made up of an axially extending shank having a frusto-conical head at its leading end which is inserted first into the bore hole. The trailing end of the shank is threaded. A sleeve formed of a deformable material laterally encloses the shank and for a portion of its length forms a cavity between its inner surface and the shank. The cavity is filled with balls formed of a hard material and it is closed at its ends. By drawing the frusto-conical head rearwardly into the sleeve, the balls deform the sleeve outwardly into anchoring contact with the bore hole.

7 Claims, 4 Drawing Figures

BALL ANCHOR DOWEL

SUMMARY OF THE INVENTION

The present invention is directed to an expansion dowel for use in a prepared bore hole or the like, and, more particularly, it concerns a ball anchor dowel including an axially extending cylindrically shaped shank threaded at its trailing end and having a frusto-conically shaped head at its leading end. The shank, adjacent the leading end, is enclosed by a deformable sleeve having an inside diameter which is, at most, equal to the greatest diameter of the frusto-conically shaped heads.

Dowels are known which have a cylindrically shaped shank or bolt body enclosed by a cylindrical sleeve and with the rear end of the shank threaded. Usually, such dowels have a frusto-conically shaped head on the leading end of the shank with the head diverging outwardly from the shank. Alternatively, a separate head part can be in threaded engagement with the leading end of the shank. After such known dowels are inserted into prepared holes in rock, masonry or similar materials, the shank and head are moved relative to the sleeve to develop the desired anchorage. Generally, this is accomplished by providing a nut or a tapped bushing in engagement with the threaded shank so that tightening the nut or tapped bushing on the shank causes the shank to move in the direction opposite to which it was introduced into the hole. While the shank is withdrawn from the hole by such an action, the sleeve is supported in a stationary position against the nut, tapped bushing or other part which cooperates with the counterbearing member. Such relative movement between the sleeve and the shank draws the frusto-conical head into the sleeve, causing the sleeve to expand outwardly into anchoring contact with the borehole. The desired anchorage is achieved by the deformation of the sleeve into contact with the wall of the borehole.

Accordingly, the anchoring forces of these known dowels is determined by the frictional contact developed between the sleeve and the wall of the borehole. Therefore, for the attainment of high anchoring forces, it is important that the maximum amount of the sleeve area be in contact with the wall of the borehole so that the load bearing capabilities of the dowel are maintained at as high a level as is possible.

Further, usually, the extent of the load bearing surface of the sleeves of these conventional dowels is hardly sufficient to attain satisfactory withdrawal forces for the dowels. In particular, the nature of the material into which the dowel is anchored is a decisive factor, because the overall anchoring action is disadvantageously affected if the material is of a non-homogeneous character, such as gravel or other hard substances, which interfere with the spreading action of the sleeve. Moreover, the sleeve is never utilized as an expanding member for its entire length, since only the leading end of the sleeve is spread or expanded affording anchorage by a relatively small part of its surface.

Therefore, it is the primary object of the present invention to provide an expansion dowel or anchor with an axially extending cylindrically shaped shank surrounded by a deformable sleeve, so that the sleeve is expanded over at least a major portion of its axial length, though the head on the shank is not displaced through a comparable axial length of the sleeve. In accordance with the present invention, the expansion of the sleeve is obtained by providing an axially extending cavity between the inside surface of the sleeve and the shank with the cavity being completely enclosed and filled with a multiplicity of small balls or spheres formed of a hard material.

In such a dowel, if the shank and frusto-conical head are moved relative to the sleeve so that the head is drawn into the sleeve, the shape of the cavity filled with small balls will change while the volume of the cavity will not be reduced because of the balls contained therein. As a consequence, the diameter of the cavity increases because its axial length is shortened as the frusto-conical head is pulled into the sleeve. As a result, the deformable sleeve is expanded outwardly and, since the effect of the balls is similar to that of a liquid, the expansion occurs uniformly over at least the axial portion of the sleeve forming the cavity. Even though the surface of the prepared borehole is uneven the sleeve will adapt to such unevenness because of the uniform pressure created in all directions. Accordingly, in addition to a positive friction contact, a form locking connection is also achieved which leads to a substantial increase in the anchoring forces developed by the dowel embodying the present invention.

While steel or other sheet metals can be used as the material for the sleeve, it is also possible to utilize a plastic sleeve.

To obtain the relative motion between the sleeve and the shank and its attached head, it is preferable if the rear or trailing end of the sleeve bears against a counterbearing secured on the threaded part of the shank. In the simplest form, a nut can be used as the counterbearing. However, washers, spacer rings or similar elements may be positioned between the sleeve and the counterbearing. For example, if a deformable plastic ring is disposed between the sleeve and the counterbearing, it is possible to compensate for certain length tolerances by deforming the ring. To provide a dowel with a tapped hole, the counterbearing may be provided in the form of a tapped or threaded bushing. In such a case, the internal thread in the bushing serves to provide the anchoring effect in moving the shank and head relative to the sleeve as well as to secure the parts to be connected to the dowel when it is in its anchored position.

To assure that the cavity containing the balls is closed on all sides, it is expedient to provide, at least at one end of the cavity, an annular shoulder, the inner dimension of which corresponds to the diameter of the cylindrically shaped shank. The shoulder, formed on one end of an inwardly extending collar, provides a closure for one end face of the cavity, the other end face can be closed by the cooperation of the leading end of the sleeve and the frusto-conically shaped head at the leading end of the shank.

Since it is essentially the property of uniform pressure distribution in all directions, as is typical of a liquid, which is utilized in the present invention, it has been found that the best results are achieved with expansion dowels where the ball size bears a certain relationship to the diameter of the shank. Preferably, the ball diameter is approximately 1/20 to 1/10 of the diameter of the cylindrically shaped shank. Such a size relationship assures that for any dowel size a favorable deformation and, accordingly, an optimal form locking engagement is obtained which increases the anchoring forces. The balls may be formed of any material of adequate hardness, however, steel balls have proven to be advantageous.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
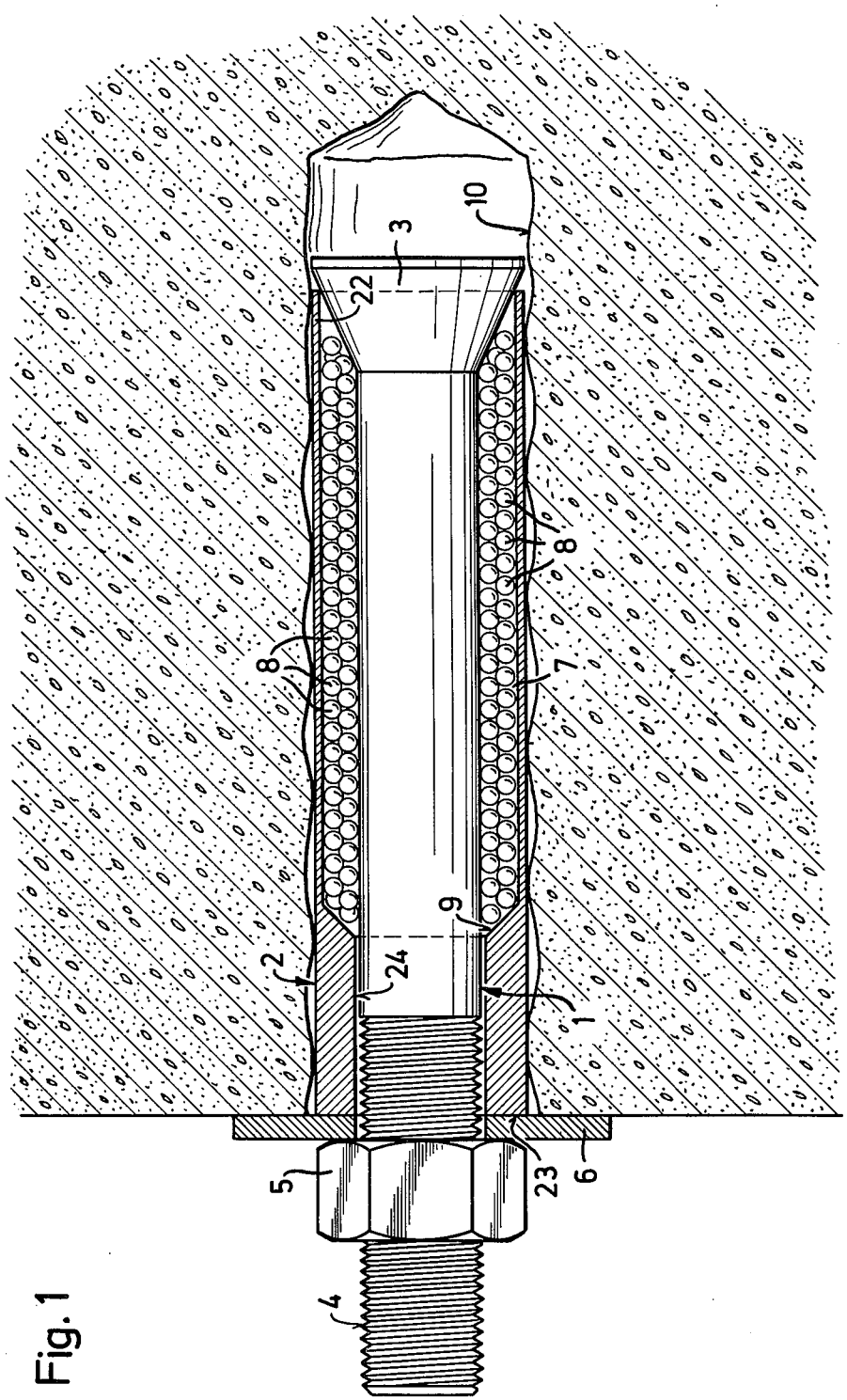
FIG. 1 is an axial sectional view of an expansion anchor, embodying the present invention, with an external thread for affording an attachment to the dowel, the anchor is shown inserted into a borehole but in the unanchored condition.

In FIG. 1 an expansion dowel is illustrated and consists of an axially extending cylindrically shaped shank 1 positioned within a sleeve 2. As shown, the expansion dowel is inserted into a borehole 10 and the leading end of the shank 1, that is, the end inserted first into the borehole has an axially extending frusto-conically shaped head 3 extending from the end of the shank. At its opposite end, that is, the trailing end or end extending outwardly from the borehole, the shank has a threaded portion 4. A nut 5 is threaded onto the threaded portion 4 and holds a washer 6 against the surface of the material into which the borehole 10 is formed.

The sleeve 2 has a leading end located at the head 3 on the shank 1 and a trailing end 23 in contacting engagement with the inwardly facing surface of the washer 6. Extending from its leading end toward its trailing end, the sleeve has a very thin wall 22 which, in combination with the cylindrically shaped surface of the shank 1 and the juxtaposed frusto-conically shaped surface of the head 3, forms an axially extending cavity 7 filled with small balls 8. The trailing end of the cavity 7 is closed by a shoulder 9 on a collar which projects inwardly from the surface of the sleeve defining the cavity into sliding contact with the cylindrically shaped shank. Accordingly, the inside diameter of the bore 24 in the collar on the trailing end of the sleeve corresponds to the diameter of the shank.

Figure 1A:
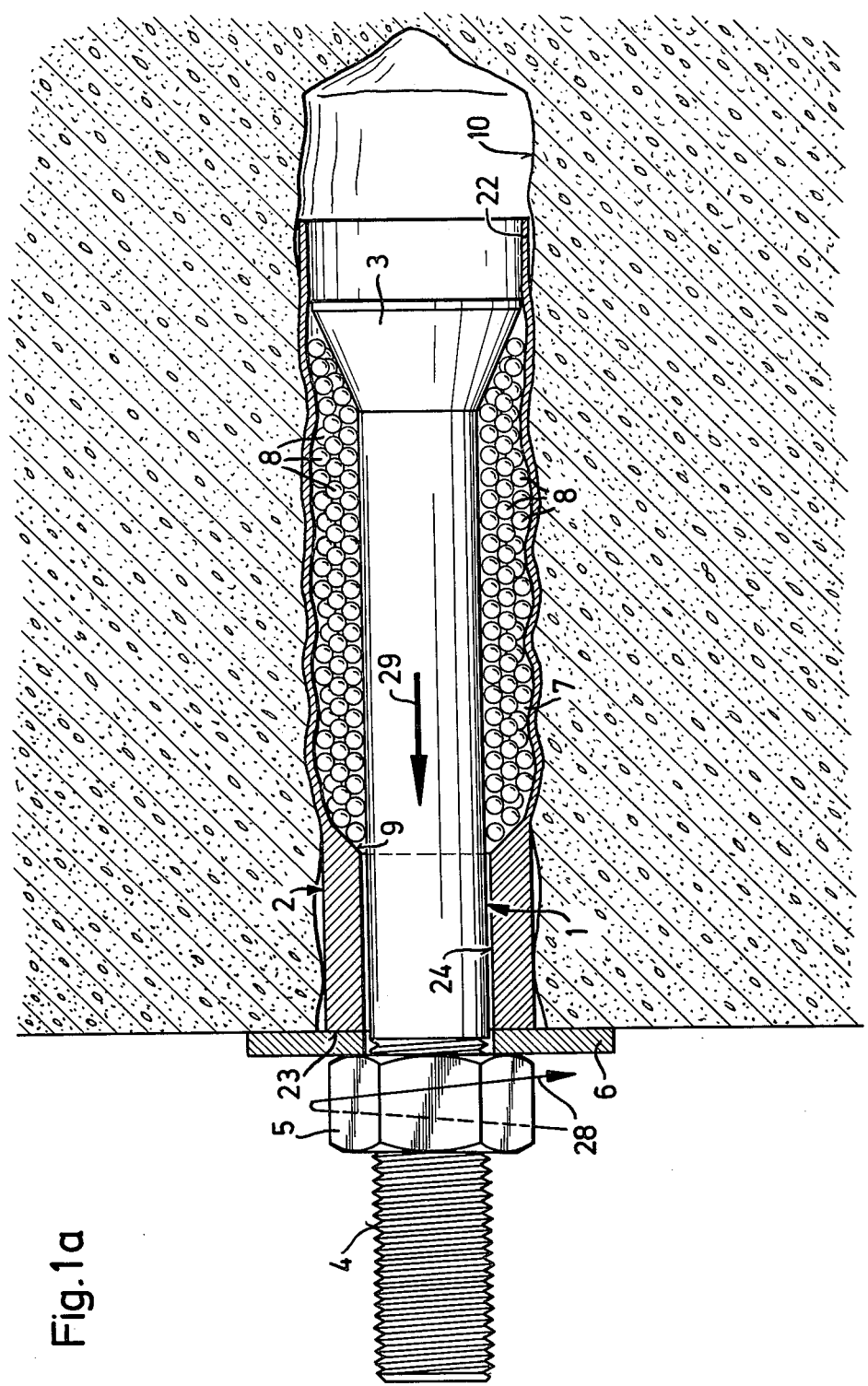
FIG. 1a is a view similar to FIG. 1 with the anchor in the anchored condition.

As shown in FIG. 1, the dowel embodying the present invention is inserted into the borehole 10, however, it is still in the unanchored condition. If the nut 5 is tightened onto the threaded portion 4 of the shank 1 as shown by the arrow 28, in FIG. 1a the shank 1 along with the frusto-conically shaped head 3 is moved relative to the sleeve in the direction of the arrow 29, with the head being drawn into the leading end of the sleeve. As the head 3 moves into the sleeve 2, it shortens the axial length of the cavity 7, however, due to the presence of the balls 8 within the cavity, the sleeve is expanded radially outwardly and presses the outer surface of the sleeve into contact with the wall of the hole 10. This creates a form locking connection between the sleeve 2 and the wall of the hole 10 for at least the axial length of the portion of the sleeve forming the cavity.

Figure 2:
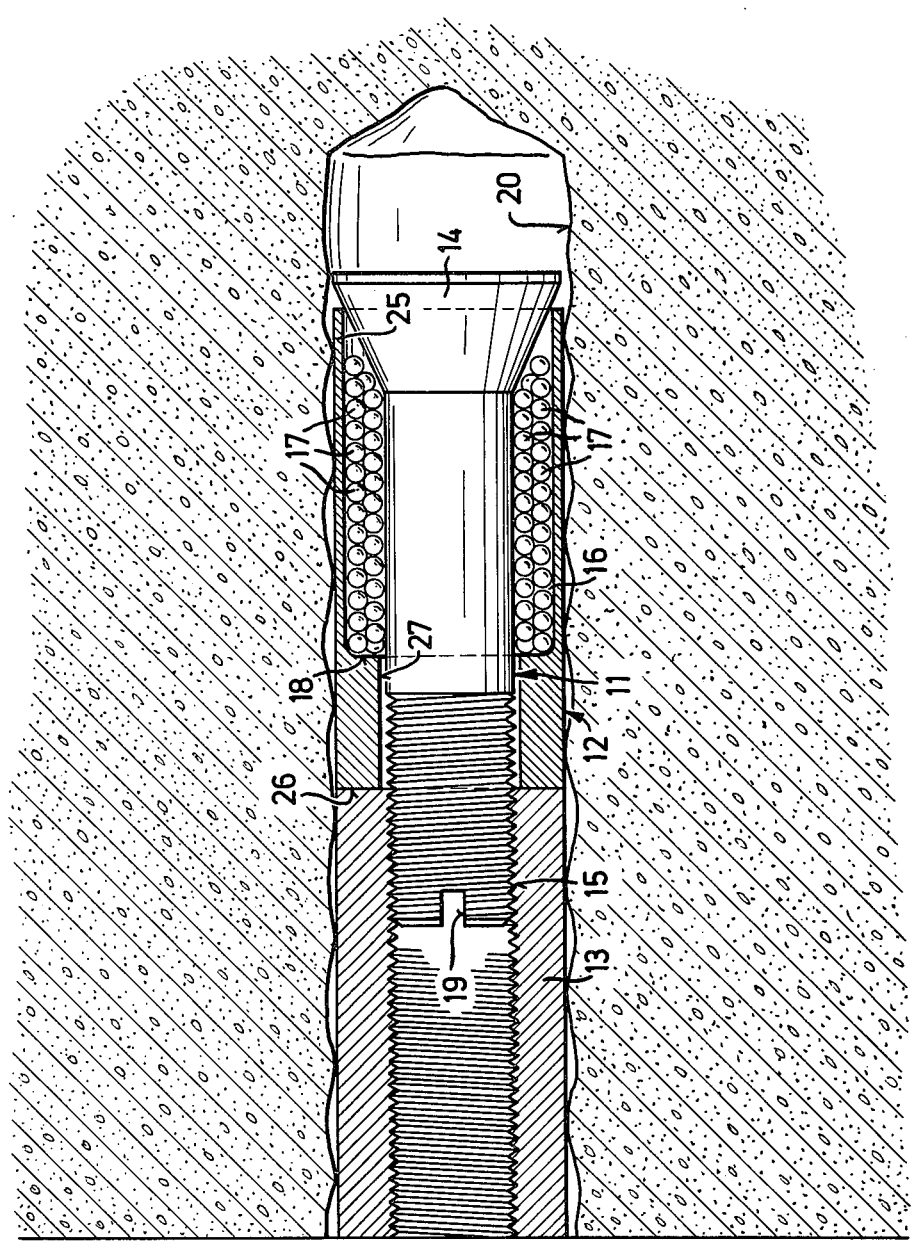
FIG. 2 is an axially extending sectional view of an expansion dowel illustrating another embodiment of the present invention in which the attachment of the dowel is obtained by an internal thread, the anchor is shown inserted into a borehole but in the unanchored condition.

In FIG. 2 another embodiment of the present invention is illustrated in which an expansion dowel is provided consisting of a cylindrically shaped axially extending shank 11, a deformable sleeve 12 laterally enclosing a portion of the shank and a tapped bushing 13 located rearwardly of the sleeve within a prepared borehole 20. As in the arrangement shown in FIG. 1, the leading end of the shank 11 has a frusto-conically shaped head 14 extending axially and diverging outwardly from the leading end of the shank. The trailing end of the shank 11 has an axially extending threaded portion 15. Extending rearwardly from its leading end for a portion of its axial length, the sleeve 12 is formed of a very thin-walled construction 25 with its inner surface spaced radially outwardly from the surface of the shank 11 forming an axially extending closed cavity 16 filled with small balls 17. The trailing end of the cavity 16 is closed by a radially inwardly directed shoulder 18 formed on the end of a collar which extends into sliding surface contact with the shank 11. Therefore, the shoulder 18 forms a closure for the rearward end of the cavity 16 and the bore 27 formed by the collar has a diameter substantially equal in dimension to the outside diameter of the shank. The collar terminates at its trailing end in an end face 26. The leading end of the cavity 16 is closed by the frusto-conically shaped surface of the head 14.

Figure 2A:
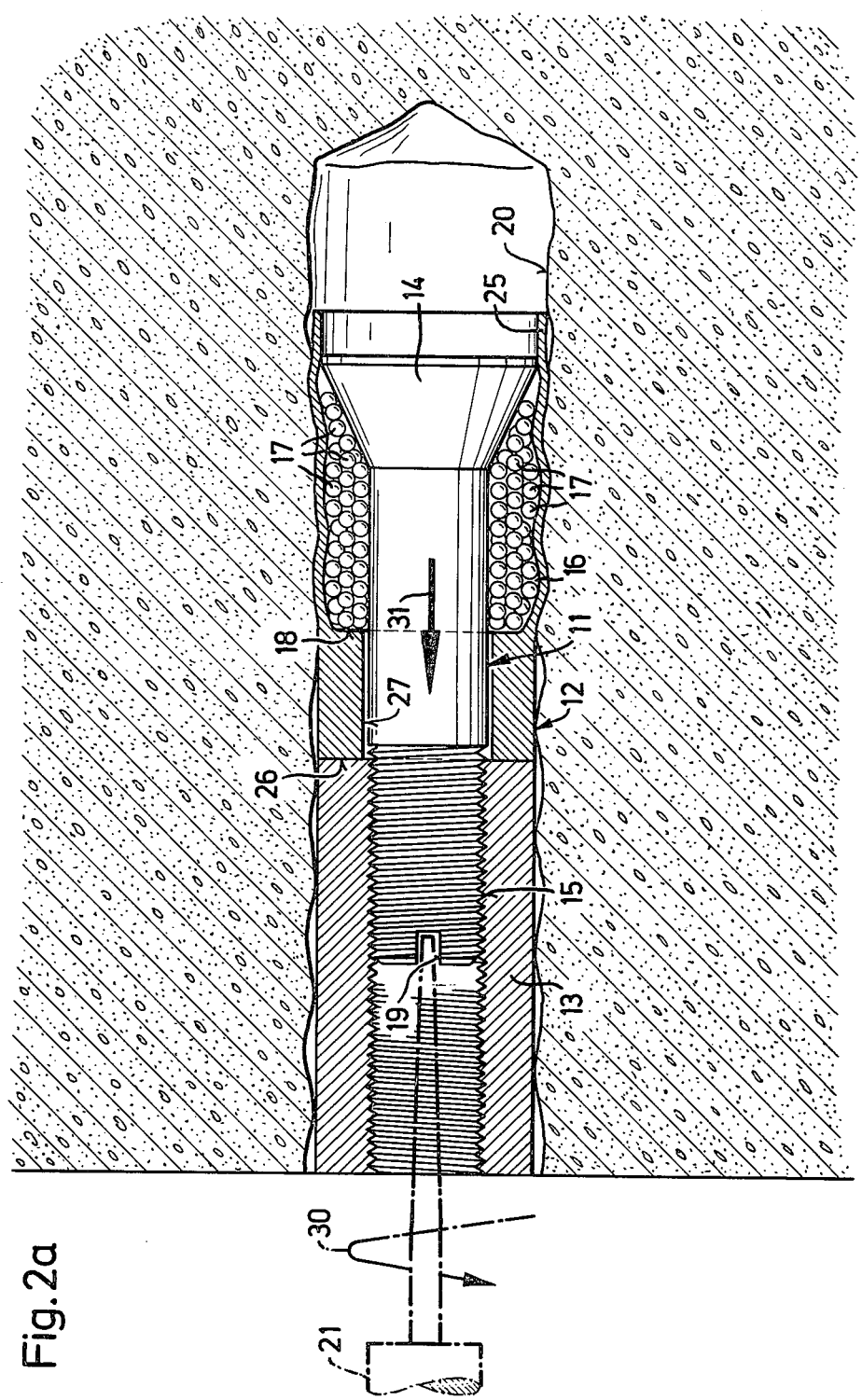
FIG. 2a is a view similar to FIG. 2 with the anchor in the anchored condition.

As with the illustration in FIG. 1, in FIG. 2 the expansion dowel, embodying the present invention, is illustrated in the unanchored condition located within the hole 20. In FIG. 2a the dowel is shown in the anchored condition. To provide the desired anchoring action, the shank 11, along with the head 14, is displaced relative to the sleeve and toward its rearward end in the direction of the arrow 31. The relative movement is provided by turning the shank 11 relative to the tapped bushing 13 with which it is in threaded connection in the direction of the arrow 30. For turning the shank 11, an appropriate tool can be inserted into the slot 19 located in the trailing end of the shank, for instance, a screwdriver 21. However, other means for providing engagement with the shank are possible in place of the slot 19, such as, a hexagonal socket within the trailing end of the shank. The relative motion between the sleeve 12 and the shank 11 and its head 14 causes a shortening of the cavity 16 in the axial direction with the result that the thin-walled portion of the sleeve 12 is expanded outwardly by the balls 17. The expansion occurs because with the balls 17 present within the cavity the volume of the cavity cannot be reduced. The expansion of the sleeve forms a form-locking engagement with the wall of the hole 20 and affords extremely high anchoring forces.

While specific embodiments of the invention have been shown and described in detail to illustrate the application of the inventive principles, it will be understood that the invention may be embodied otherwise without departing from such principles.

What is claimed is:

1. An expansion dowel for use in a prepared borehole and the like, comprising an axially extending cylindrically shaped shank having a leading end and a trailing end with the leading end arranged to be inserted first into the borehole, said shank being threaded at its trailing end and having a frusto-conically shaped head secured to and extending axially outwardly from the forward end of said shank with the frusto-conically shaped surface widening outwardly from the leading end, an axially extending deformable sleeve laterally enclosing at least a portion of said shank and said sleeve adjacent said head having a maximum inside diameter which is not greater than the largest diameter of said frusto-conically shaped head, said sleeve having a leading end adjacent the leading end of said shank and a trailing end spaced axially from the leading end toward the trailing end of said shank, wherein the improvement comprises that said sleeve from its leading end for a portion of its axial length toward its trailing end is spaced radially outwardly from said shank forming an axially extending annular cavity therebetween, said sleeve having a radially inwardly projecting annular shaped collar extending axially from a plane between the leading end and trailing end of said sleeve toward the trailing end thereof and the radially inner surface of said collar closely fitting the outside diameter of said shank so that said shank can be slidably displaced relative to said collar, the end of said collar closer to the leading end of said sleeve forming a radially inwardly directed annular shoulder forming a closure for the end of said cavity closer to the trailing end of said shank, said head extending into and forming a closure for the leading end of said sleeve so that said cavity is closed in the axial and radial directions, and a plurality of small balls formed of a hard material filled into said cavity so that said balls are disposed in contact with one another and with the inner surface of said sleeve and the surface of said shank within the axially extending range of said cavity and are capable of deforming said sleeve when said head is moved relative to said sleeve inwardly into the cavity within said sleeve.

2. An expansion dowel, as set forth in claim 1, wherein a counterbearing member is provided in threaded engagement with the trailing end of said shank, said sleeve having a leading end adjacent said head and an oppositely directed trailing end located closer to the trailing end of said shank and the trailing end of said sleeve disposed in bearing contact with said counterbearing member.

3. An expansion dowel, as set forth in claim 2, wherein said conterbearing is a washer fitted on said shank and a nut threaded on said shank on the opposite side of said washer from said sleeve so that said nut holds said washer against the end of said sleeve.

4. An expansion dowel, as set forth in claim 2, wherein said counterbearing comprises an interiorly threaded bushing in threaded engagement with said shank.

5. An expansion dowel, as set forth in claim 4, wherein the outside diameter of said counterbearing is substantially equal to the outside diameter of said sleeve with one end of said counterbearing in contact with the trailing end of said sleeve.

6. An expansion dowel, as set forth in claim 1, characterized in that the diameter of said balls is in a range of 1/20 to 1/10 of the diameter of said cylindrically shaped shank.

7. An expansion dowel, as set forth in claim 6, wherein said balls are formed of steel.

* * * * *

UNITED STATES PATENT OFFICE
CERTIFICATE OF CORRECTION

Patent No. 4026184  Dated May 31, 1977

Inventor(s) Dante Sozzi

It is certified that error appears in the above-identified patent and that said Letters Patent are hereby corrected as shown below:

In the heading of the patent [75] should read as follows:

--[75] Inventor: Dante Sozzi, Vaduz, Liechtenstein--.

Signed and Sealed this

Seventeenth Day of January 1978

[SEAL]

Attest:

RUTH C. MASON
*Attesting Officer*

LUTRELLE F. PARKER
*Acting Commissioner of Patents and Trademark*